(12) United States Patent
Blumer et al.

(10) Patent No.: US 9,783,317 B2
(45) Date of Patent: Oct. 10, 2017

(54) POWER CONVERTER, GENERATOR AND ARCHITECTURE FOR HIGH EFFICIENCY AUXILIARY POWER UNIT

(71) Applicant: HONEYWELL INTERNATIONAL INC., Morristown, NJ (US)

(72) Inventors: Eric Blumer, Scottsdale, AZ (US); Cristian Anghel, Oro Valley, AZ (US); Wayne Pearson, Oro Valley, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 404 days.

(21) Appl. No.: 14/455,649

(22) Filed: Aug. 8, 2014

(65) Prior Publication Data
US 2016/0039371 A1    Feb. 11, 2016

(51) Int. Cl.
*B64D 41/00* (2006.01)
*B60L 11/02* (2006.01)
*F02C 7/268* (2006.01)
*F02C 7/32* (2006.01)
*B64D 13/06* (2006.01)

(52) U.S. Cl.
CPC .............. *B64D 41/00* (2013.01); *B60L 11/02* (2013.01); *F02C 7/268* (2013.01); *F02C 7/32* (2013.01); *B64D 2013/0611* (2013.01); *B64D 2221/00* (2013.01); *F05D 2220/50* (2013.01); *F05D 2220/76* (2013.01); *Y02T 50/44* (2013.01); *Y02T 50/54* (2013.01); *Y02T 50/671* (2013.01)

(58) Field of Classification Search
CPC ............. B60L 11/02; B64D 2013/0611; B64D 2221/00; B64D 41/00; F02C 7/268; F02C 7/32; F05D 2220/50; F05D 2220/76; Y02T 50/44; Y02T 50/54; Y02T 50/671
See application file for complete search history.

(56) References Cited

U.S. PATENT DOCUMENTS

| 4,684,081 | A | * | 8/1987 | Cronin | ................... | B64D 13/06 244/118.5 |
| 5,977,645 | A | * | 11/1999 | Glennon | ................... | H02J 4/00 290/38 R |
| 6,037,752 | A | | 3/2000 | Glennon | | |
| 6,577,106 | B2 | | 6/2003 | Lazarovich | | |
| 7,112,944 | B1 | * | 9/2006 | Kojori | ................. | H02M 5/4505 290/31 |
| 7,612,514 | B2 | | 11/2009 | Anghel et al. | | |
| 7,701,082 | B2 | | 4/2010 | Lazarovich et al. | | |
| 7,863,868 | B2 | | 1/2011 | Xu et al. | | |
| 8,427,001 | B2 | * | 4/2013 | Anghel | ..................... | B60L 1/00 307/86 |

(Continued)

OTHER PUBLICATIONS

Anghel, et al., Copending U.S. Appl. No. 14/197,565, filed Mar. 5, 2014.

*Primary Examiner* — Tulsidas C Patel
*Assistant Examiner* — S. Mikailoff
(74) *Attorney, Agent, or Firm* — Shimokaji IP

(57) ABSTRACT

A high efficiency multifunction power system for an aircraft is provided. The system includes an AC generator and a multifunction power converter-controller module including at least one multifunction power converter-controller. The at least one multifunction power converter-controller is configured to function as a power converter and a controller to perform multiple operation modes.

11 Claims, 16 Drawing Sheets

(56) References Cited

U.S. PATENT DOCUMENTS

| | | | |
|---|---|---|---|
| 2006/0232249 A1* | 10/2006 | Kojori | H02M 5/4505 322/29 |
| 2008/0111420 A1* | 5/2008 | Anghel | H02J 4/00 307/9.1 |
| 2008/0217466 A1* | 9/2008 | Bhargava | B64C 25/40 244/50 |
| 2008/0303490 A1* | 12/2008 | Xu | H02K 19/26 322/29 |
| 2009/0121552 A1* | 5/2009 | Mann, III | B64F 1/364 307/80 |
| 2010/0026089 A1* | 2/2010 | Anghel | B60L 1/00 307/9.1 |
| 2010/0252691 A1* | 10/2010 | Malkin | B64C 13/28 244/76 R |

* cited by examiner

POWER CONVERTER, GENERATOR AND ARCHITECTURE FOR HIGH EFFICIENCY AUXILIARY POWER UNIT

BACKGROUND OF THE INVENTION

The present invention generally relates to aircraft electric power systems, and more particularly to a power system for a high efficiency auxiliary power unit (APU) system.

Many current aircraft electric power systems are 3-phase AC at 400 Hz and the electrical generators are required to produce power at a constant frequency of 400 Hz. The synchronous generators installed on auxiliary power units, named APU generators herein, also produce 400 Hz without the need for a constant speed drive mechanism, because the APUs have a constant speed.

Since an APU is sized for worst-case operating conditions of ground altitude and ground temperature, it may be operated more efficiently at lower speeds for much of the time, which saves fuel. Since the APU generator output frequency is proportional to its speed a method to obtain 400 Hz power from the APU generator when running the APU at lower speeds may be needed.

Airport infrastructures may not provide conditioned air to an aircraft when at an airport gate. Many aircraft use the APU to produce pressurized air to run an Environmental Control System (ECS) of the aircraft. This method of providing conditioned air burns fuel which increases overall operating cost as well as emissions. A method for operating the aircraft ECS using electrical power from the airport gate is very desirable.

An Electric Green Taxi System may provide fuel savings by taxiing the airplane using electric motors, powered via power controllers from the APU generator. The additional weight associated with such systems may reduce the fuel savings so weight mitigation is desirable.

In view of the foregoing, there is a need for high efficiency low weight aircraft power systems to reduce fuel consumption and emissions.

SUMMARY OF THE INVENTION

In one aspect of the present invention, a power system for an auxiliary power unit (APU) of an aircraft comprises an AC generator and a multifunction power converter-controller module electrically connected to the AC generator, the multifunction power converter-controller module including at least one multifunction power converter-controller (MPCC), wherein the AC generator is configured to use ground power to run as a motor to provide mechanical power for the APU so that the APU provides air for an environmental control system, and wherein ground power is supplied through the at least one MPCC.

In another aspect of the present invention, a method of operating an auxiliary power unit (APU) of an aircraft comprises supplying power to a multifunction power converter-controller (MPCC) of the aircraft from a ground power network, starting a generator of the APU with the power received from the MPCC, motoring the generator by ground power received from the MPCC; and driving a bleed air system of the aircraft via the APU with mechanical power supplied from the generator.

In yet another aspect of the present invention, a power architecture for an aircraft comprises a power unit including at least one DC/DC power converter and at least one AC/DC power converter, at least one multifunction power converter-controller (MPCC) connected to the power unit, the at least one MPCC being configured to function as a power converter and a motor controller, and a generator connected to the at least one MPCC, wherein the generator is configured to use ground power, via the MPCC, to run as a motor to provide mechanical power for an auxiliary power unit (APU).

These and other features, aspects and advantages of the present invention will become better understood with reference to the following drawings, description and claims.

DETAILED DESCRIPTION OF THE INVENTION

Figure 1A:
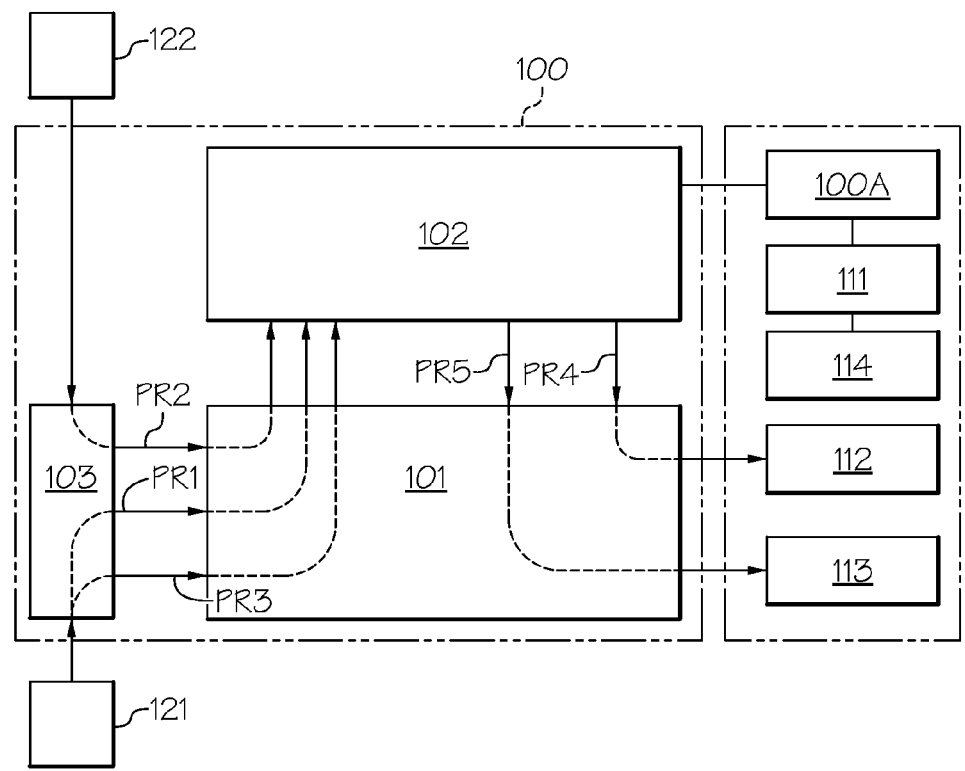
FIG. 1A is a block diagram of a multifunction power system for a high efficiency APU system according to an exemplary embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

In general, exemplary embodiments of the present invention address the multiple operations performed by a power system for a high efficiency auxiliary power unit (APU) system. The present invention provides a high efficiency aircraft auxiliary power unit (APU) system (APU system hereinafter) including at least one multifunctional power converter-controller used for multiple functions such as starting an auxiliary power unit (APU) by using an APU generator of the APU, operating an Electric Green Taxi System (EGTS) powered by the APU generator, enabling reduced speed APU operation and receiving ground power assistance for the APU using the APU generator as a motor to operate various aircraft systems such as the Environmental Control System. The use of a multifunction power converter-controller for multiple functions provides significant system benefits in terms of overall weight, fuel burn, and emissions reduction for the aircraft.

Accordingly, in one embodiment, in one operation mode of the multifunction power converter-controller module (MPCC module hereinafter) for the power system used in the high efficiency APU system, the MPCC module may operate as a start controller to start the APU using the APU generator as a starter while the needed power may be supplied from either ground power or a battery. In another operation mode, the MPCC module may operate the EGTS from the APU generator by driving the EGTS wheel actuators or traction motors. In another operation mode, the MPCC module may be used as a motor controller to drive the APU generator as a motor using external gate power supplied by for example an airport gate, which reduces APU fuel burn while allowing the APU to provide bleed air or pressurized air for the aircraft Environmental Control System (ECS). In yet another operation mode, the MPCC module may operate as a 400 Hz AC static inverter to provide 400 Hz power for the aircraft when the APU is operated at reduced speeds, i.e., the APU runs at a speed less than 100%, and the generator supplies an AC power output with less than 400 Hz to reduce fuel use. Accordingly, 100% speed may correspond to APU rated (nominal) speed that produces an APU generator shaft speed resulting in 400 Hz at the generator output. In accordance with the principles of the present invention, all the aforementioned operating modes may be independent and may not occur at the same time so that for example a single MPCC module may be used to operate each mode separately and in any given order. This may significantly reduce weight and operating cost.

Figure 1B:
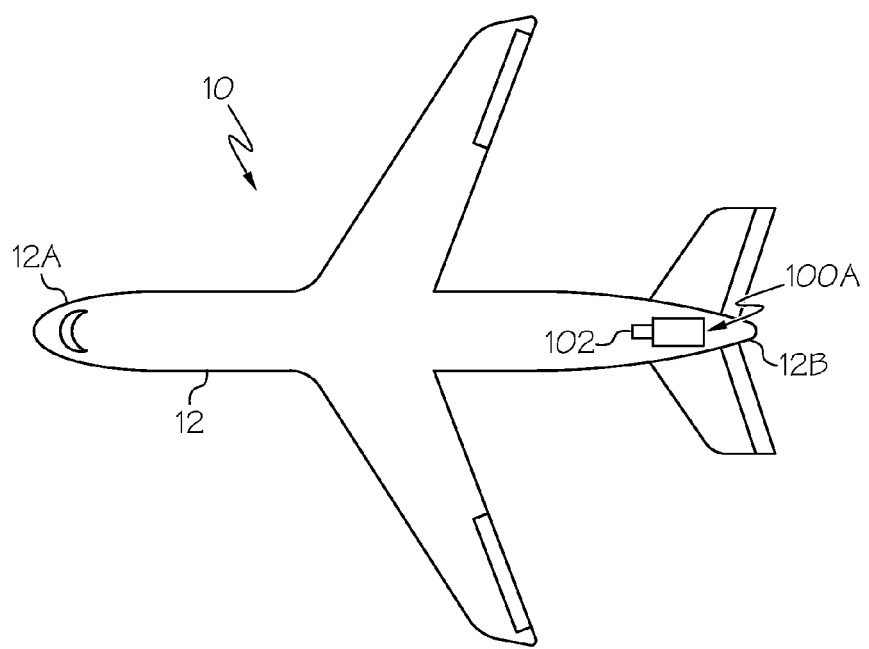
FIG. 1B is schematic representation of an aircraft including an APU with an APU generator of the present invention.

Referring now to FIG. 1A, a power system 100 for a high efficiency APU system of an aircraft 10 (see FIG. 1B) is shown according to an exemplary embodiment of the present invention. The power system 100 may include components of at least one MPCC module 101, an APU generator 102 (hereinafter, the generator 102) and at least one power unit 103 located on the aircraft 10. Referring to FIG. 1B, an exemplary aircraft 10 including an exemplary APU which may be connected to the power system 100 is shown. The aircraft 10 may include an aircraft body 12 including a front cockpit section 12A and a tail section 12B. The APU 100A may be located at the tail section 12B of the aircraft 10. The generator 102 may be located on the APU 100A and may be an electrical machine. The APU 100A may be a small turbine engine that normally burns fuel to provide compressed air and electric power for the aircraft while on the ground.

As will be explained below, the MPCC module 101 may include one or more multifunction power converter-controllers, and other power converters and/or controllers, such as a controllable frequency generator (CFG) controller and a power filter or a switching noise filter (see FIGS. 3A and 4A). The exemplary multifunction power converter-controllers used in the following embodiments may include power converters such as DC/AC motor controllers and/or DC/AC static inverters, and controller circuitry to perform the below described functions.

The generator 102 may be an AC generator or a controllable frequency generator. The MPCC module 101 of the power system 100 may be electrically connected to the generator 102 and the power unit 103. The components of the system 100 are also connected to various other operational systems of the aircraft. Particularly, the generator 102 installed on the APU 100A may mechanically power the APU so that the APU supplies air or pneumatic power to run a bleed air system 111 of the aircraft to provide bleed air for the ECS 114, and the MPCC module 101 may be connected to an Electric Green Taxi System (EGTS) 112 of the aircraft to power and control the EGTS. The MPCC module 101 may also be connected to a main bus 113 such as a 400 Hz bus, of the aircraft to provide power for various aircraft systems. The power unit 103 may include AC/DC and DC/DC power converters. The power unit 103 may receive power from either a ground power source 121, such as an airport power network, or a battery power source 122 of the aircraft.

In a first exemplary operation mode of the power system 100, the MPCC module 101 may start the APU 100A using the generator 102 powered by ground power from the ground power source 121. In this operation mode, electrical power may flow through the exemplary power route PR1. Accordingly, AC ground power may be converted at the power unit 103 and received by the MPCC module 101 as DC power which may be converted at the MPCC module 101 and supplied to the generator 102 as AC power to start the APU 100A using the generator.

In a second exemplary operation mode of the power system 100, the MPCC module 101 may start the APU 100A using the generator 102 powered by battery power from the battery power source 122. In this operation mode, electrical power may flow through the exemplary power route PR2. Accordingly, low voltage DC power, for example 28 VDC may be converted to high voltage DC power, for example 270 VDC, at the power unit 103 and received by the MPCC module 101 which converts it to AC power and supplies to the generator 102 as AC power to start the APU 100A.

In a third exemplary operation mode of the power system 100, the MPCC module 101 may be used as a motor controller and may drive the generator 102 using ground power from the ground power source 121. The generator 102 may, in turn, supply mechanical power to the APU, which in turn supplies pneumatic power for the bleed air system 111 to provide bleed air for the ECS 114 of the aircraft 10 while the aircraft is on the ground. In this operation mode, electrical power may flow through the exemplary power route PR3, where ground electrical power may be fed into the system 100 via the power unit 103, from the MPCC module 101 to the generator 102. As mentioned above, the APU 100A may be a small turbine engine that normally burns fuel to provide compressed air and electric power for the aircraft while on the ground. Feeding ground electrical power from the airport gate into the generator 102, which may be operated as a motor and provides mechanical power to the APU 100A, reduces the amount of fuel burned by the APU while providing the same compressed air. Depending on the capacity of the generator 102, the need for the APU to burn fuel may be fully or partially eliminated. The generator 102 may provide via the APU 100% of the needed power to supply bleed air for the bleed air system 111 and then the ECS 114, eliminating any fuel burn, or the generator may provide less than 100% of the needed power, which may require some fuel burn to compensate the power gap. Since airport gate electrical power is much less costly than jet fuel, this mode of operation reduces operation cost. Furthermore, this operation mode enables the use of existing aircraft ECS for cooling and is compatible with existing airport infrastructure. It may be further compatible with future More Electric Architecture (MEA) airport infrastructure (increased gate power) and may eliminate the need to add ground based air conditioning carts.

In a fourth exemplary operation mode of the system 100, the MPCC module 101 may be used as a controller and may drive the wheel actuators or traction motors (not shown) of the EGTS 112 using the power supplied by the generator 102 to taxi the aircraft. In this operation mode, electrical power may flow through the exemplary power route PR4, where generator power may be fed into the EGTS 112 via the MPCC module 101.

In a fifth exemplary operation mode of the system 100, the MPCC module 101 may be used as a 400 Hz static inverter using the power supplied by the generator 102 when the APU 100A is operated at reduced speeds, i.e., when the APU is run at a speed less than 100%, such as about 90%, or at a speed rate of about 90%-94%. Running an APU at reduced speeds may reduce its fuel consumption; however, reduced speeds may also reduce the AC power frequency of the generator, which may make the resulting low frequency power incompatible with the aircraft's systems requiring fixed 400 Hz AC power. In this operation mode, electrical power may flow through the exemplary power route PR5, where the generator power having less than 400 Hz AC power frequency due to the lower speed of the APU 100A, may be received by the MPCC module 101, converted to 400 Hz and fed to the main bus 113 to power various systems of the aircraft which can only accept 400 Hz AC power. Running the APU 100A at reduced speeds may advantageously reduce both the fuel used and the environmental pollution. When more power is required, the APU 100A may increase its speed to 100% and the generator 102 may feed 400 Hz power to the main bus 113 directly. In the exemplary embodiments, all five operation modes are independent and may not occur at the same time so that each operation mode can be performed with a single power converter-controller module, thus with minimal weight penalty.

Figure 2:
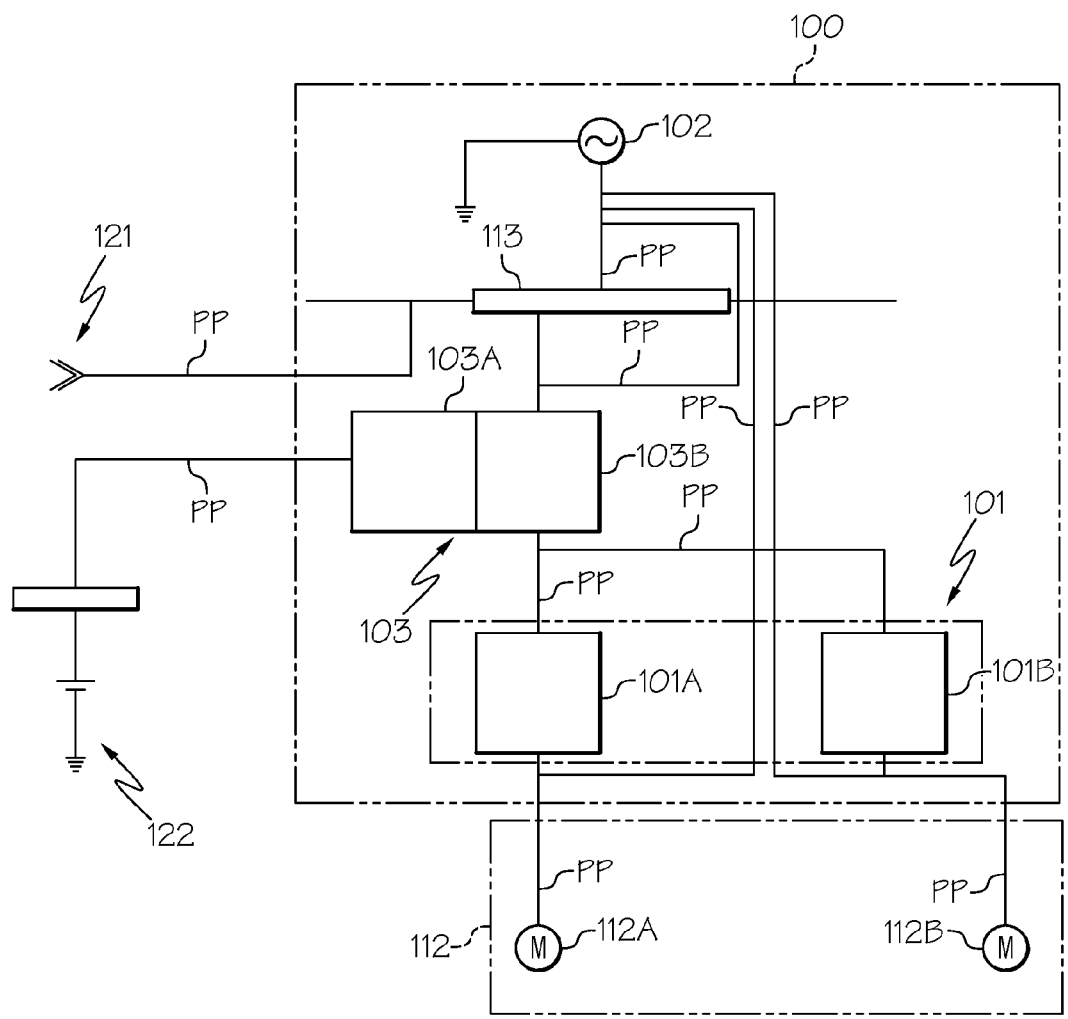
FIG. 2 is a power architecture of a power system for a high efficiency APU system according to an exemplary embodiment of the present invention.

Referring now to FIG. 2, an exemplary power architecture or circuitry of the power system 100 for a high efficiency APU system of the aircraft is shown. In the description of the following power architectures, an APU or aircraft may refer to for example the APU 100A, and the aircraft 10 shown in FIGS. 1A and 1B, and will not be numbered to avoid confusion. In this power architecture, the MPCC module 101 of the system 100 may include a first multifunction power converter-controller (MPCC) 101A and a second multifunction power converter-controller (MPCC) 101B, which may be connected to the generator 102, the power unit 103 and the EGTS 112 via various power paths 'PP'. The power paths electrically connect the components of the system 100 and may include a plurality of circuit switches 'S' (shown from FIG. 3B onwards) to enable or disable power paths 'PP' in order to achieve the desired operation mode. The power unit 103 of the system 100 may include a first power converter 103A, which can be connected to the battery source 122 when needed, and a second converter 103B, which can be connected to the ground power source 121 or the generator 102 via the main bus 113 when needed. The second converter 103B may be connected to both the first MPCC 101A and the second MPCC 101B of the MPCC module 101, which may be, in turn, connected to a first EGTS motor 112A and a second EGTS motor 112B of the EGTS 112, respectively. The first and second MPCCs 101A, 101B and the MPCCs shown in the following embodiments (FIGS. 3A-4G) may include power converters such as DC/AC motor controllers and/or DC/AC static inverters, and controller circuitry to control, to perform for example the following functions: Starting the APU using the generator 102 powered by ground power; starting the APU using the generator 102 powered by battery power, driving the generator 102 by ground power so as to assist the APU to supply bleed air or pneumatic power to run the bleed air system to provide air for the ECS, driving the EGTS, function as static inverters to provide 400 Hz electrical power for aircraft systems and equipment that require such power when the APU is run at a speed less than 100%, such as about 90%, or at a range of about 90%-99%, or about 90%-94%, for fuel economy.

Figure 3A:
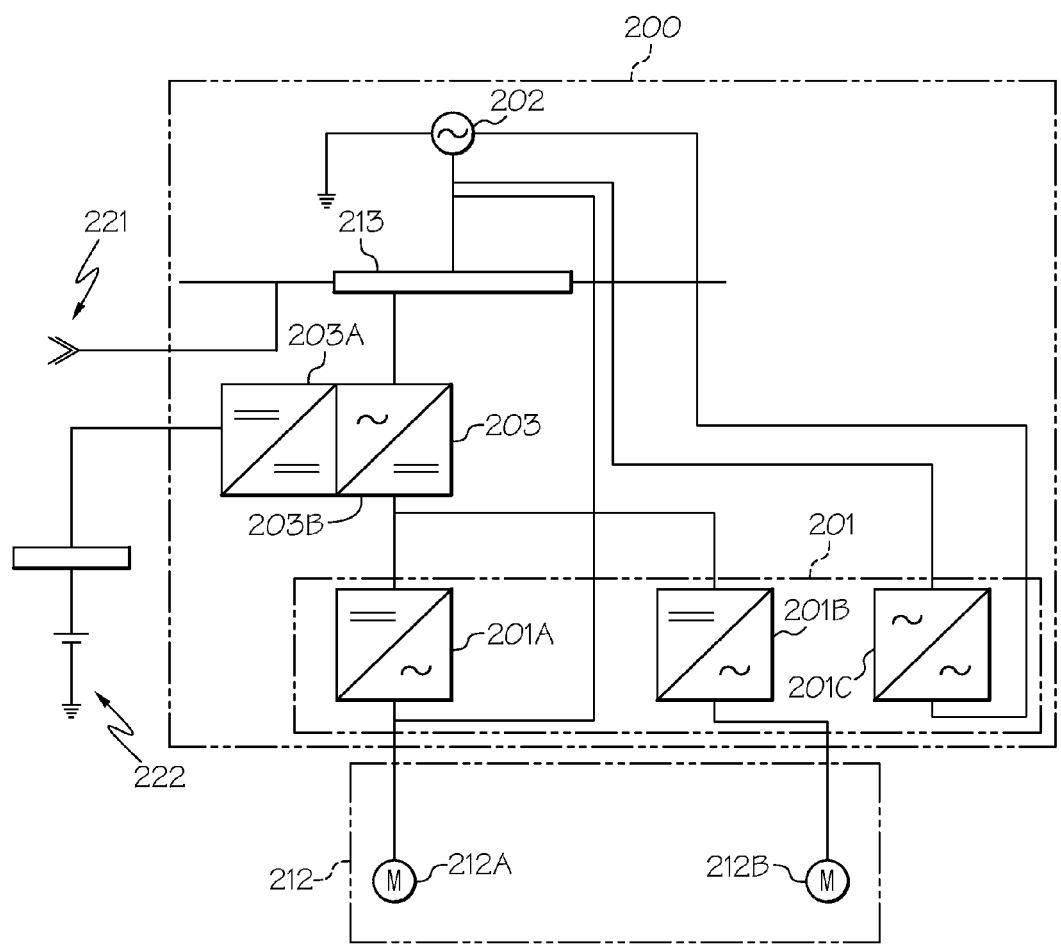
FIGS. 3A-3F show an exemplary power architecture of a power system performing various operation modes according to an exemplary embodiment of the present invention.

Referring now to FIG. 3A, an embodiment of a power system 200 for a high efficiency APU system of the present invention is shown. The power system 200 may include a MPCC module 201 which is in connection with a generator 202 (APU generator), a power unit 203 and an EGTS 212, as described above. The power unit 203 of the system 200 may include: a first power converter 203A, which may be a DC/DC power converter and can be connected to a battery source 222 of the aircraft when needed; and, a second converter 203B, which may be a AC/DC power converter and can be connected to a ground power source 221 or the generator 202 via the main bus 213 of the aircraft when needed.

In this embodiment, the MPCC module 201 may include a first MPCC 201A, a second MPCC 201B, a controllable frequency generator (CFG) and a controllable frequency generator controller 201C (CFG controller). In this embodiment, the generator 202 is a CFG. The CFG controller 201C may control the frequency of the generator's AC power output, independent of the rotational speed of the generator, to maintain a constant output frequency that may be 400 Hz. As will be explained below, this may be especially important when the APU is run at less than 100% speed. An exemplary CFG controller is described in commonly assigned, U.S. Pat. No. 7,863,868, incorporated by reference herein in its entirety.

Figure 3B:
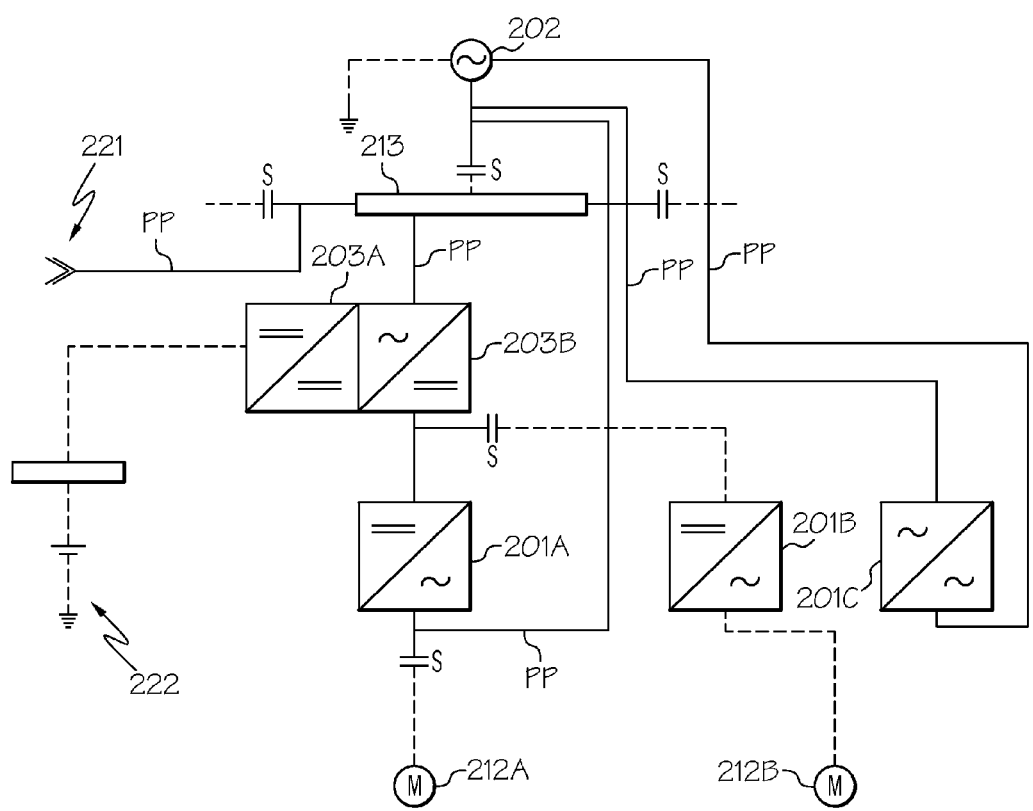
Figure 3C:
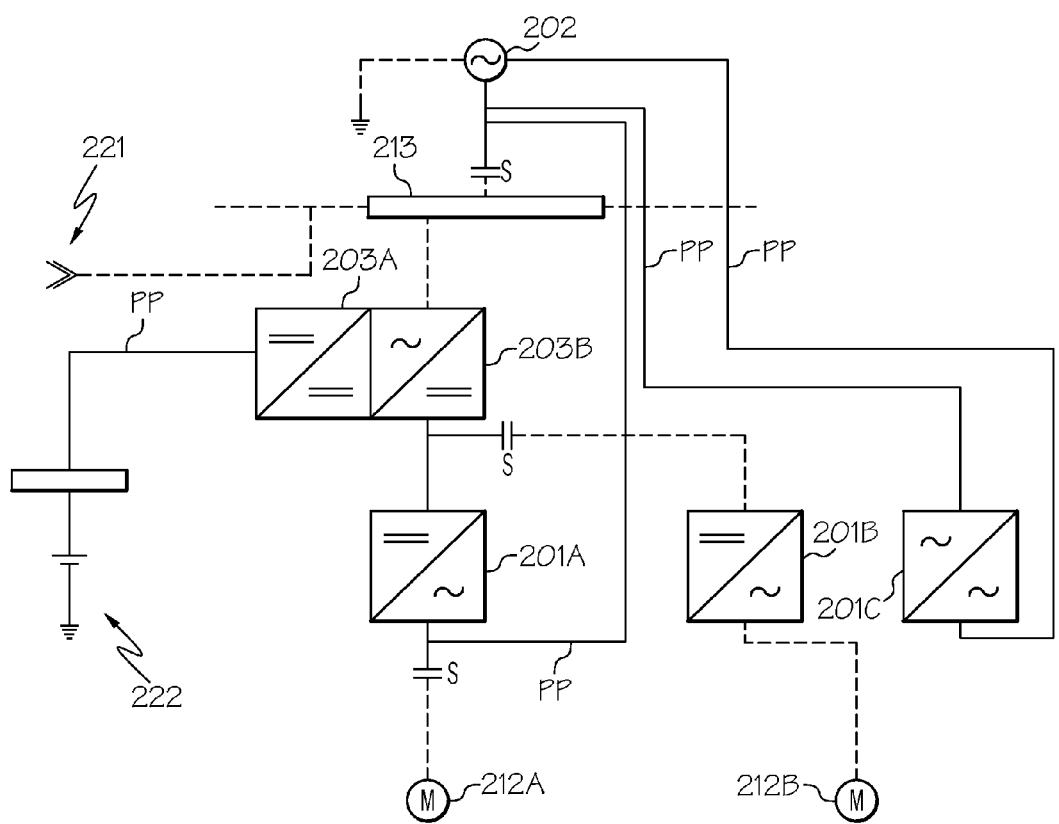

Referring to FIGS. 3B-3F, exemplary operation modes of the power system 200 are shown. In the following aircraft power architecture examples, power paths 'PP' having current flow or power are shown in solid lines while the power paths 'PP' having no current flow or no power are shown in dotted lines. As will be shown below, by controlling (by closing or opening them) various switches 'S' placed along the power paths PP, the current flow in any power path can be enabled or disabled in a desired manner so as to perform any one of the described operation modes. Referring to FIG. 3B, in a first operation mode of the system 200 (FIG. 3A), the first MPCC 201A may start the APU using the generator 202 powered by ground power from the ground power source 221. In this operation mode, AC ground power of 115 VAC may be converted at the AC/DC converter 203B to 270 VDC and may be received by the first MPCC 201A as DC power which is converted to AC power and supplied to the generator 202 to start the APU using the generator 202. Referring to FIG. 3C, in a second operation mode of the system 200, the first MPCC 201 may start the APU using the generator 202 powered by battery power from the battery power source 222. In this operation mode, DC power of 28 VDC supplied by the battery power source 222 may be converted at the DC/DC converter 203A from 28 VDC to 270 VDC and may be received by the first MPCC 201A as DC power which is converted to AC power and supplied to the generator 202 to start the APU using the generator 202.

Figure 3D:
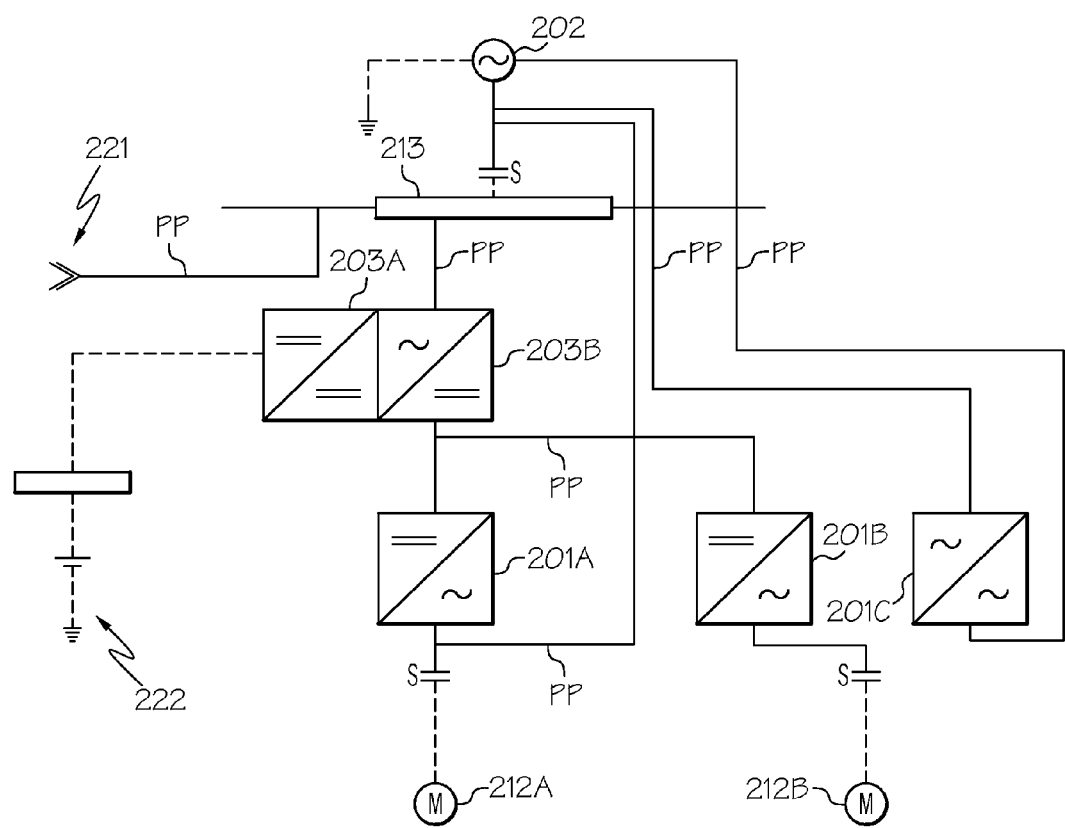

Referring to FIG. 3D, in a third exemplary operation mode of the system 200, the MPCC module 201 (FIG. 3A) may be used as a controller and may drive the generator 202 using ground power from the ground power source 221. The generator 202 provides mechanical power to the APU, which in turn, supplies pneumatic power for the bleed air system 111 (FIG. 1A) to provide bleed air for the ECS 114 (FIG. 1A) of the aircraft while the aircraft is on the ground. In this operation mode, AC ground power of 115 VAC may be converted at the AC/DC converter 203B to 270 VDC and received by the first MPCC 201A as DC power which may be converted to AC power and supplied to the generator 202. As described above, the generator 202, powered by the power from the ground power source 221 such as an airport power network, may provide mechanical power to the APU so that the APU may supply compressed air and electric power for the aircraft while on the ground.

Figure 3E:
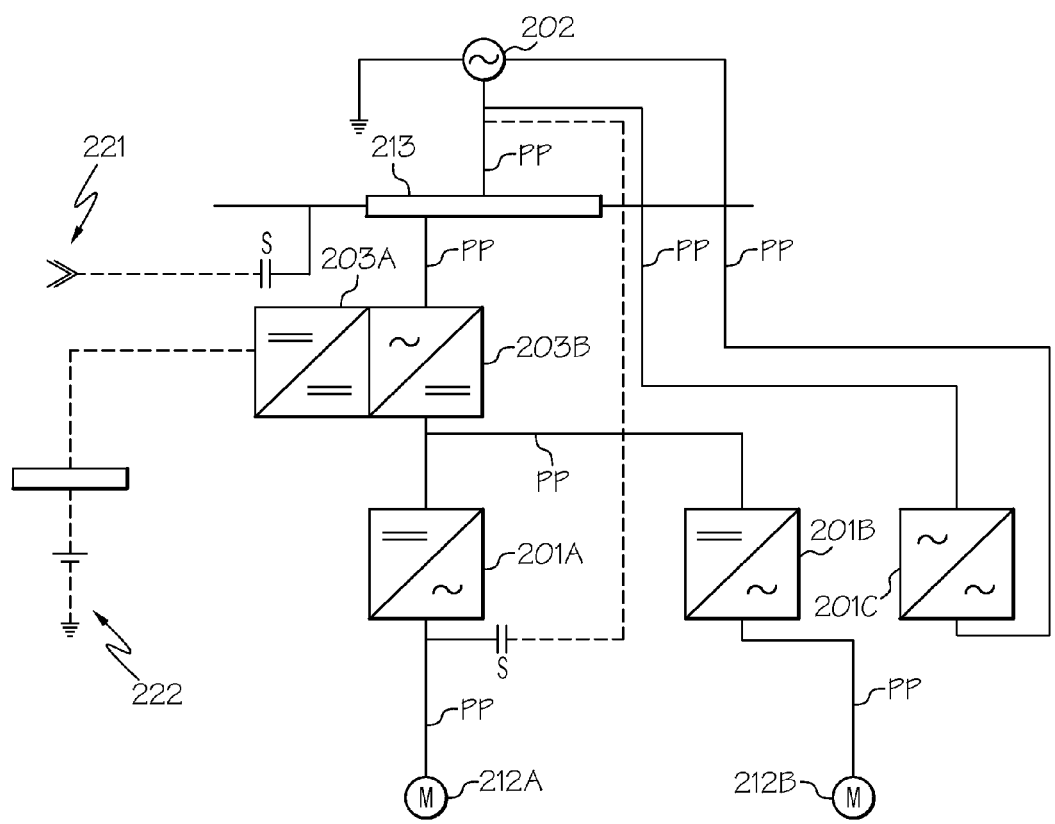

Referring to FIG. 3E, in a fourth exemplary operation mode of the system 200, the MPCC module 201 (FIG. 3A) may be used as a controller and may drive the EGTS 212 (FIG. 3A) using the power supplied by the generator 202. In this operation mode, 115 VAC power from the generator 202 is converted at the AC/DC converter 203B to 270 VDC and received by the first MPCC 201A and the second MPCC 201B as DC power which is converted to AC power and supplied to the first wheel actuator 212A or traction motor and the second wheel actuator 212B or traction motor of the EGTS, respectively, to taxi the aircraft.

Figure 3F:
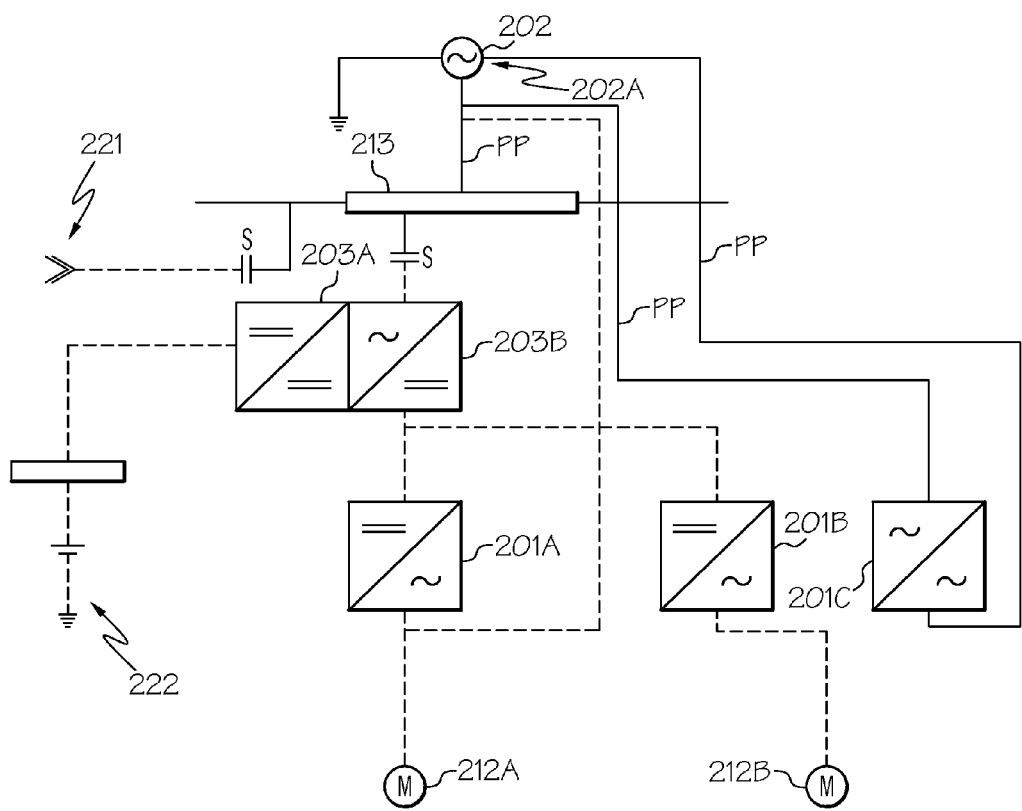

Referring to FIG. 3F, in a fifth exemplary operation mode of the system 200, the CFG controller 201C within the MPCC module 201 may be used to control the excitation of the CFG generator 202 to provide 400 Hz output when the APU is operated at reduced speeds, i.e., when the APU is run at a speed less than 100%, such as 90%, or at a speed range of about 90%-99%, or about 90%-94%. As described above, operating an APU at reduced speeds may reduce its fuel consumption; however, reduced speeds may also result in the reduction in power frequency, which makes the resulting low frequency power incompatible with the aircraft's systems requiring fixed 400 Hz AC power. In this operation mode, when the APU is run at reduced speeds, AC power may be supplied to a power excitation input 202A of the generator 202 which controls the excitation of the generator such that the generator produces 400 Hz at terminals and delivers it to the main bus 213 of the aircraft as 400 Hz AC power to power various systems of the aircraft which can only accept 400 Hz AC power.

Figure 4A:
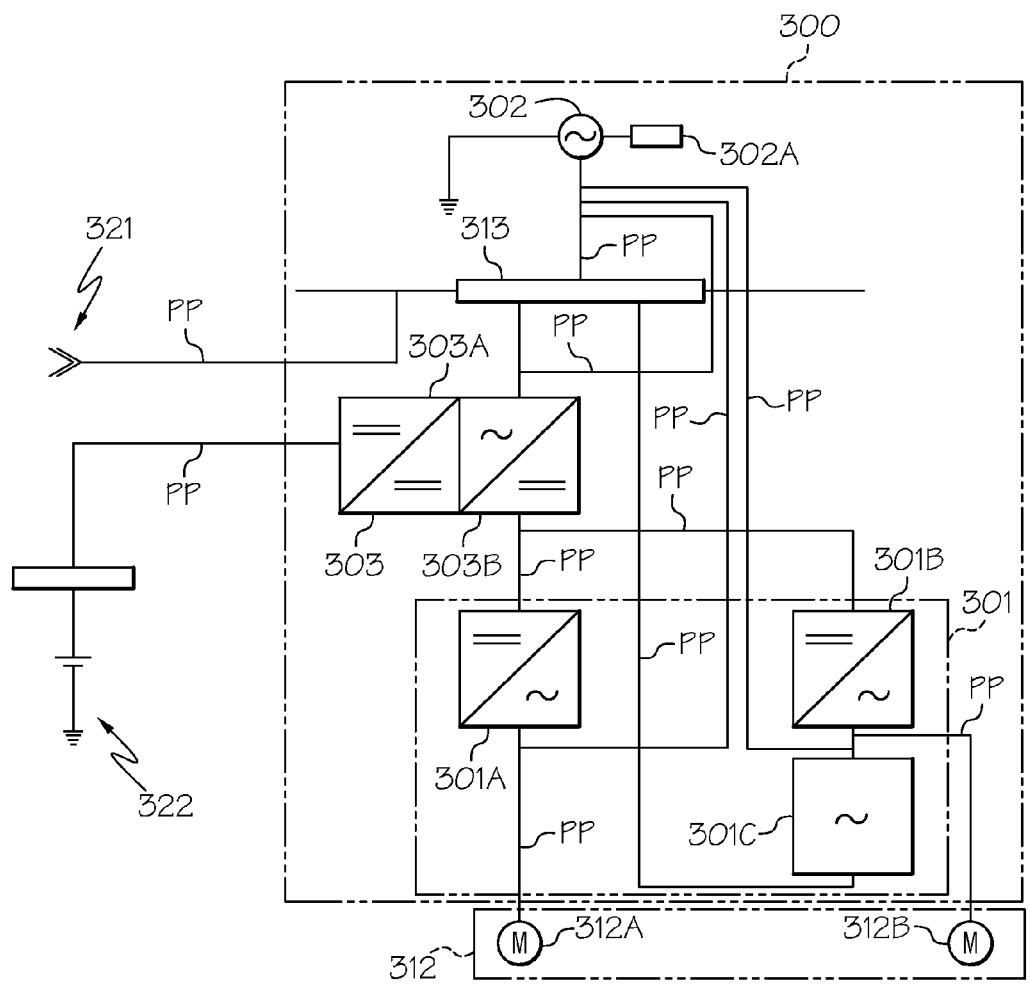
FIGS. 4A-4G show another exemplary power architecture of a power system performing various operation modes according to an exemplary embodiment of the present invention.

Referring now to FIG. 4A, an embodiment of a power system 300 for a high efficiency APU system of the present invention is shown. The power system 300 includes a MPCC module 301 which is in connection with a generator 302 (APU generator), a power unit 303 and an EGTS 312, as described above. The generator 302 may include a generator control unit (GCU) 302A. The GCU 302A may control the excitation of the generator 302, such that the generator 302 provides a regulated output voltage. The power unit 303 of the power system 300 may include: a first power converter 303A, which may be a DC/DC power converter and can be connected to a battery source 322 of the aircraft when needed; and, a second converter 303B, which may be a AC/DC power converter and can be connected to a ground power source 321 or the generator 302 via the main bus 313 of the aircraft when needed.

In this embodiment, the MPCC module 301 may include a first MPCC 301A, a second MPCC 301B and a filter 301C, such as a 4-wire transformer and filter that may be connected to the second MPCC 301B. The "4-wire transformer" is a known method for providing the neutral connection. The aircraft main bus 313 may require a 3-phase power with a neutral connection. The "filter" smoothes the AC power waveform because the supply needs to be a very smooth sinusoid (high power quality, low harmonics). As will be explained below, this may be especially important when the APU is run less than 100% speed and MPCC 301B operates as a static inverter.

Figure 4B:
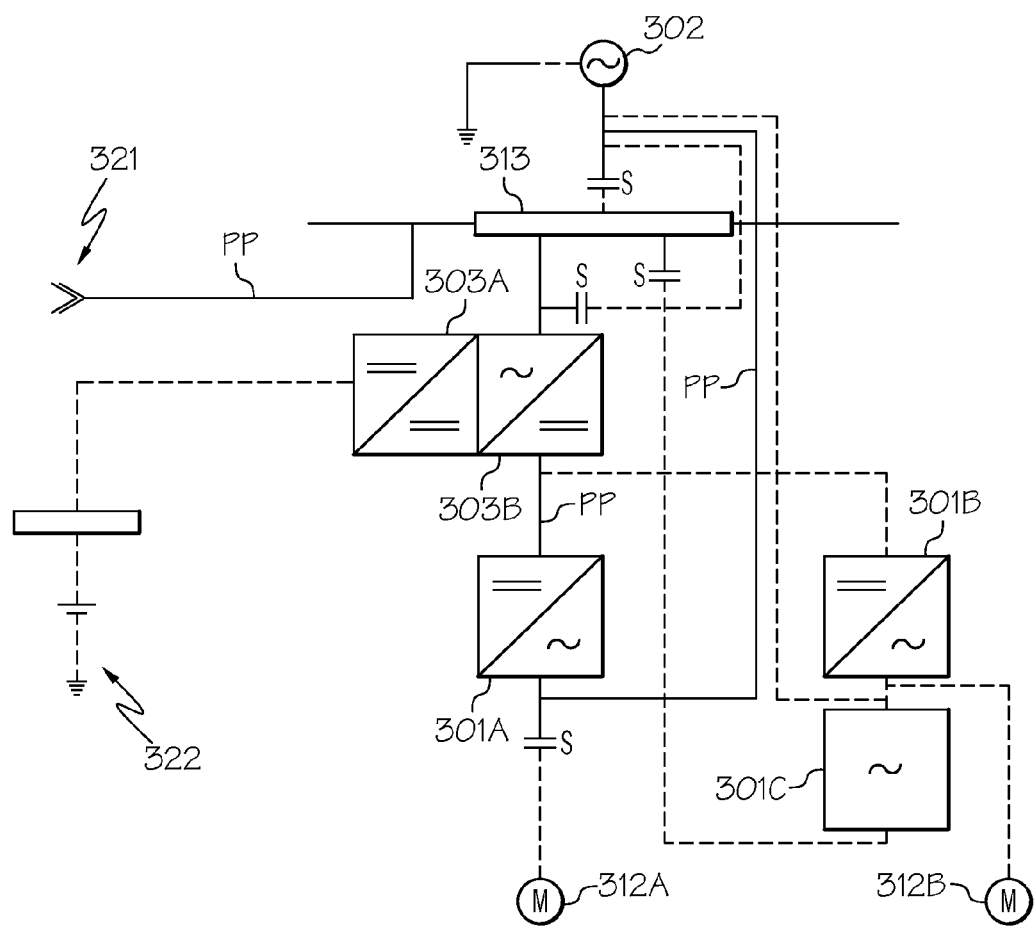
Figure 4C:
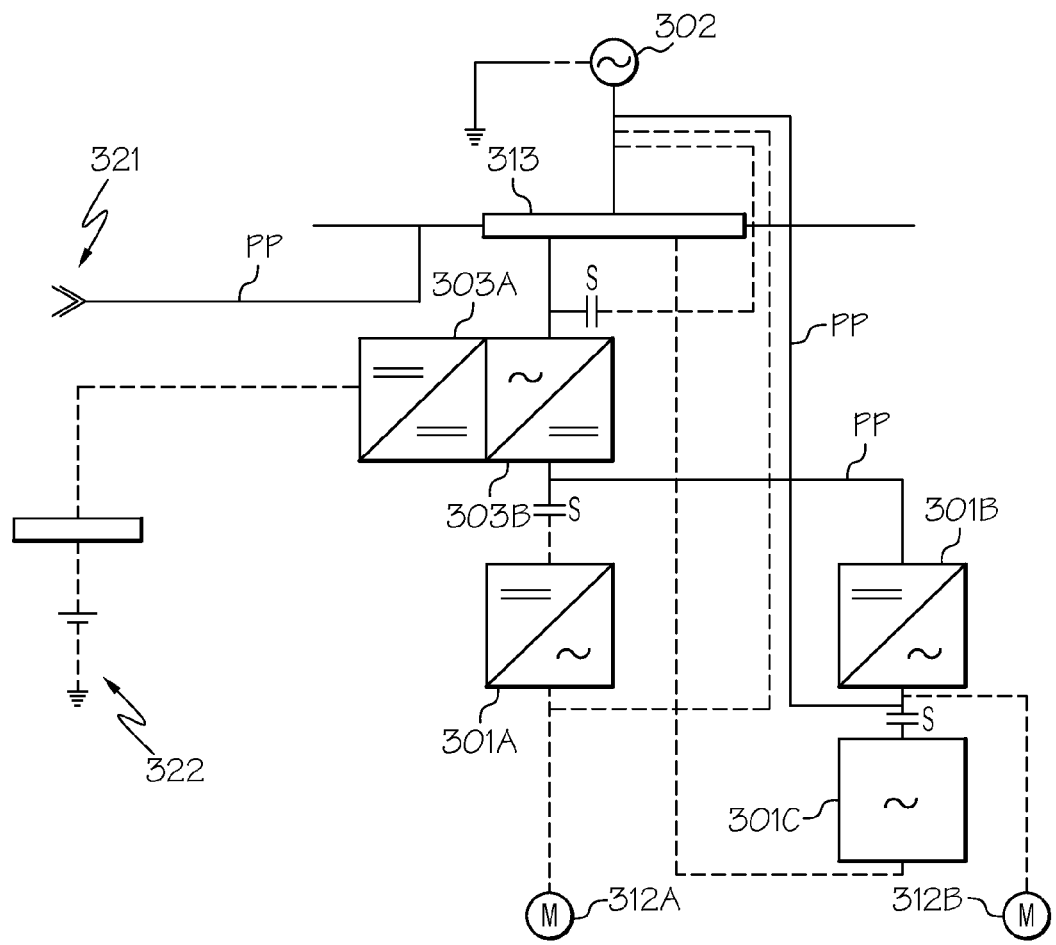
Figure 4D:
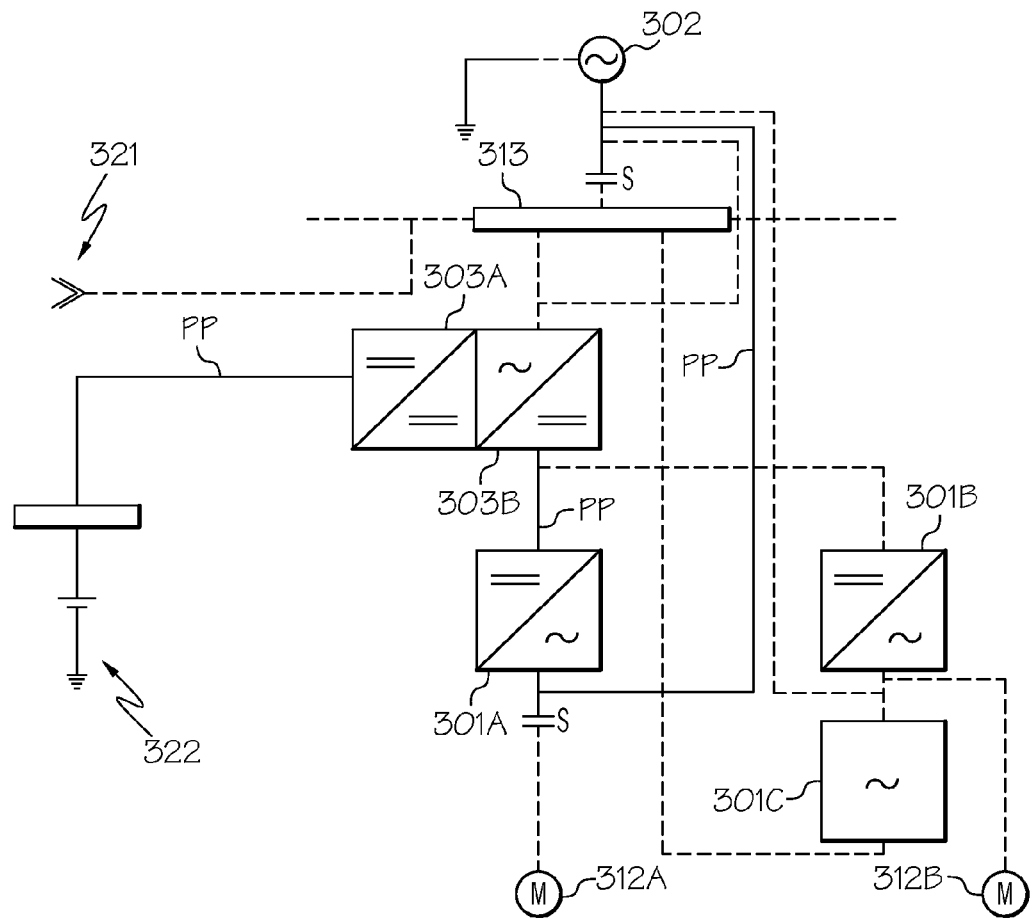

Referring to FIGS. 4B-4G, exemplary operation modes of the power system 300 (FIG. 4A) are shown. Referring to FIGS. 4B-4C, in a first operation mode of the system 300, the APU may be started using the generator 302 by either the first MPCC 301A (FIG. 4B) or the second MPCC 301B (FIG. 4C) using ground power from the ground power source 321. In this operation mode, AC ground power of 115 VAC may be converted at the AC/DC converter 303B to 270 VDC and received by either the first MPCC 301A or the second MPCC 301B as DC power which is converted to AC power and supplied to the generator 302 to start the APU using the generator 302. Referring to FIG. 4D, in a second operation mode of the system 300, the first MPCC 301 may start the APU using the generator 302 powered by the battery power from the battery power source 322. In this operation mode, DC power of 28 VDC supplied by the battery power source 322 is converted at the DC/DC converter 303A from 28 VDC to 270 VDC and received by the first MPCC 301A as DC power which is converted to AC power and supplied to the generator 302 to start the APU using the generator 202.

Figure 4E:
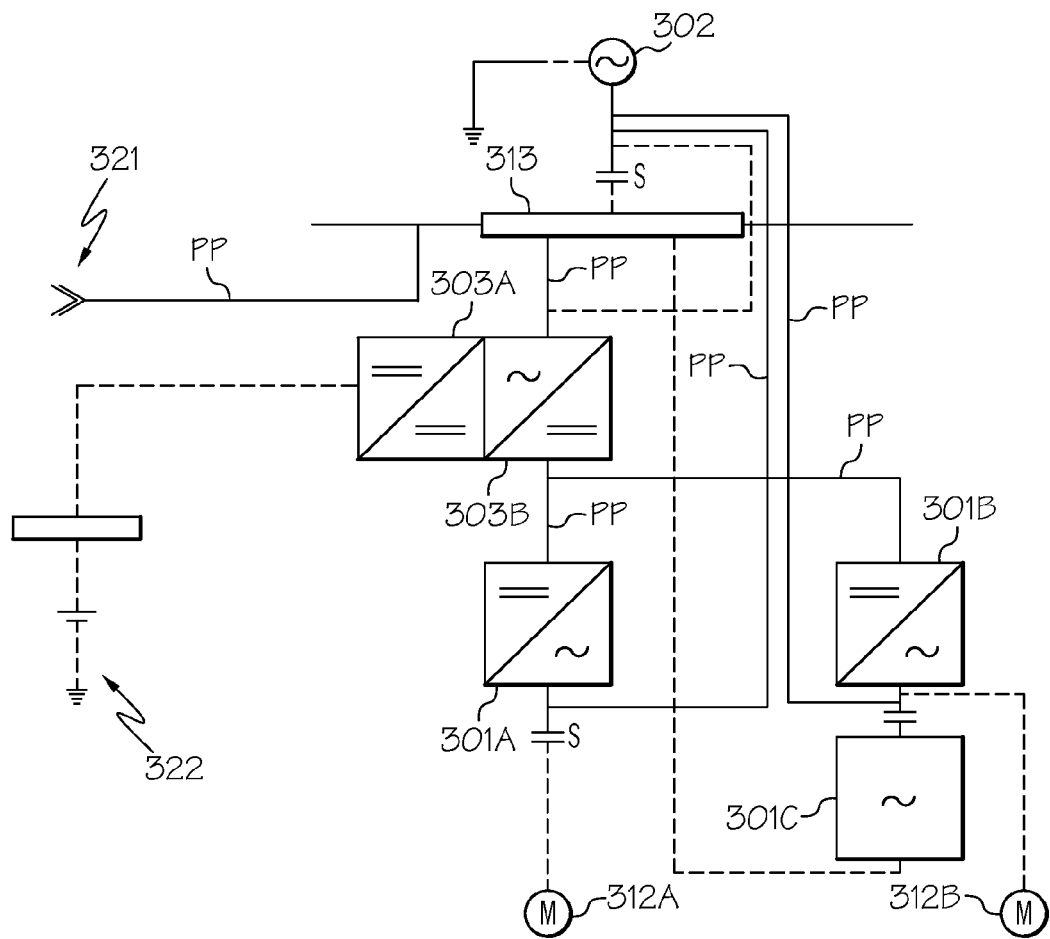

Referring to FIG. 4E, in a third exemplary operation mode of the system 300, the MPCC module 301 (FIG. 4A) may be used as a controller and may drive the generator 302 using ground power from the ground power source 321. The generator 302 may supply mechanical power to the APU which in turn supplies pneumatic power for the bleed air system 111 (FIG. 1A) to provide bleed air for the ECS 114 (FIG. 1A) of the aircraft while the aircraft is on the ground. In this operation mode, AC ground power of 115 VAC is converted at the AC/DC converter 303B to 270 VDC and received by the first MPCC 301A and the second MPCC 301B as DC power which is converted to AC power and supplied to the generator 302. As described above, the generator 302 powered by the power from the ground power source 321, such as an airport power network, assists the APU which provides bleed air and electric power for the aircraft while on the ground.

Figure 4F:
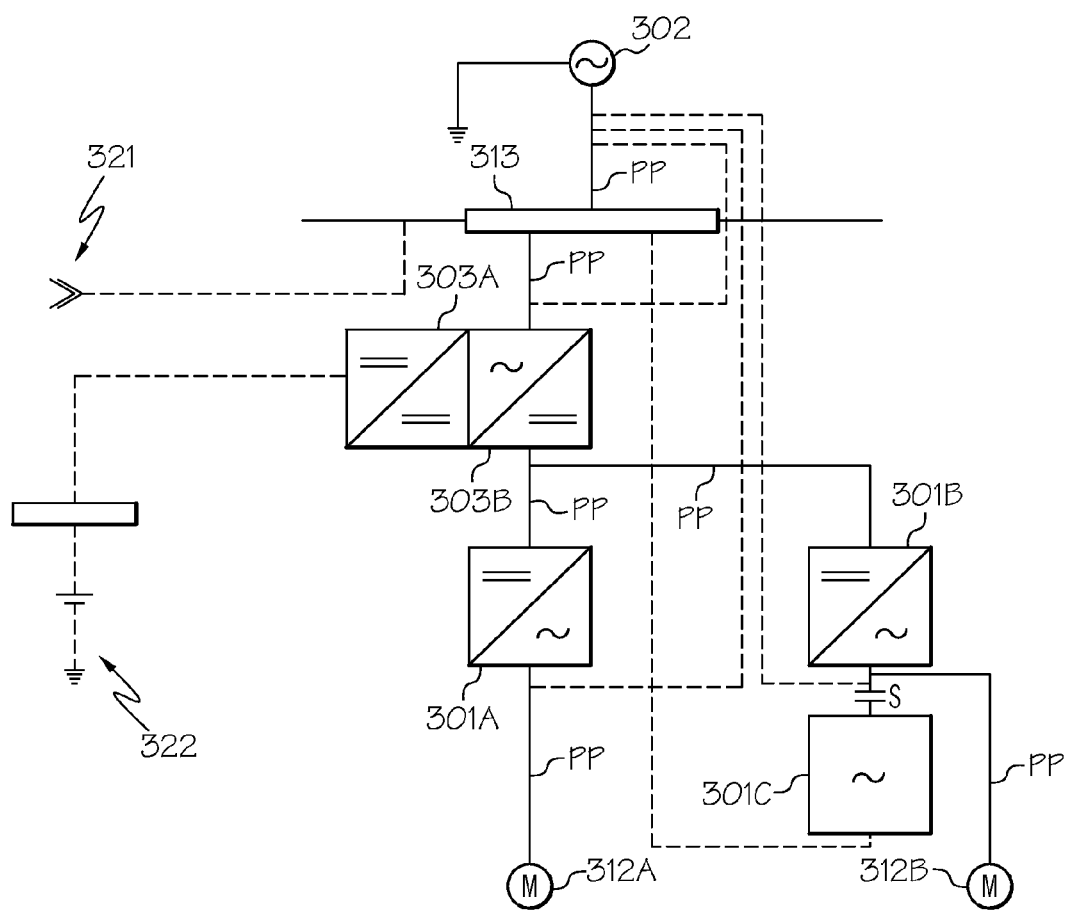

Referring to FIG. 4F, in a fourth exemplary operation mode of the system 300, the MPCC module 301 (FIG. 4A) may be used as a controller and may drive the EGTS system 312 (FIG. 4A) using the power supplied by the generator 302. In this operation mode, 115 VAC power from the generator 302 may be converted at the AC/DC converter 303B to 270 VDC and may be received by the first MPCC 301A and the second MPCC 301B as DC power which is converted to AC power and supplied to the first wheel actuator 312A or traction motor and the second wheel actuator 312B or traction motor of the EGTS, respectively, to taxi the aircraft on the ground.

Figure 4G:
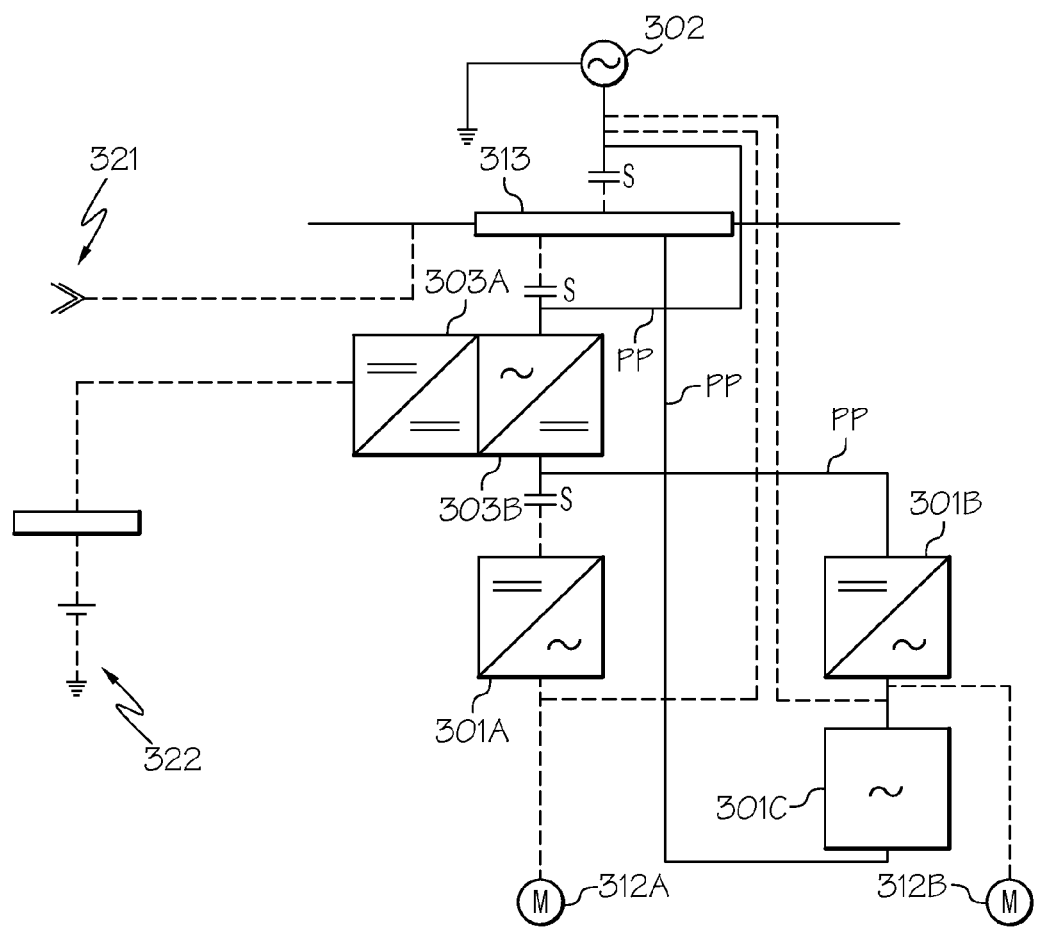

Referring to FIG. 4G, in a fifth exemplary operation mode of the system 300, the MPCC module 301 may be used as a 400 Hz static inverter using the power supplied by the generator 302 when the APU is operated at reduced speeds, i.e., when it is run at a speed less than 100%, such as about 90% or at a speed range of about 90%-99%, or about 90%-94%. As describe above, operating an APU at reduced speeds may reduce its fuel consumption; however, reduced speeds may also result in the reductions in power frequency, which makes the resulting low frequency power incompatible with the aircraft's systems requiring fixed 400 Hz AC power. In this operation mode, when the APU is run at reduced speed, AC power with less than 400 Hz may be supplied from the generator 302 and received by the second MPCC 301B which converts the less than 400 Hz power frequency to 400 Hz and delivers it to the 4-wire transformer and filter 301C to provide a neutral connection and smooth the AC waveform. Filtered power may be delivered to the main bus 313 of the aircraft as 400 Hz AC power to power various systems of the aircraft which can only accept 400 Hz AC power.

Figure 5:
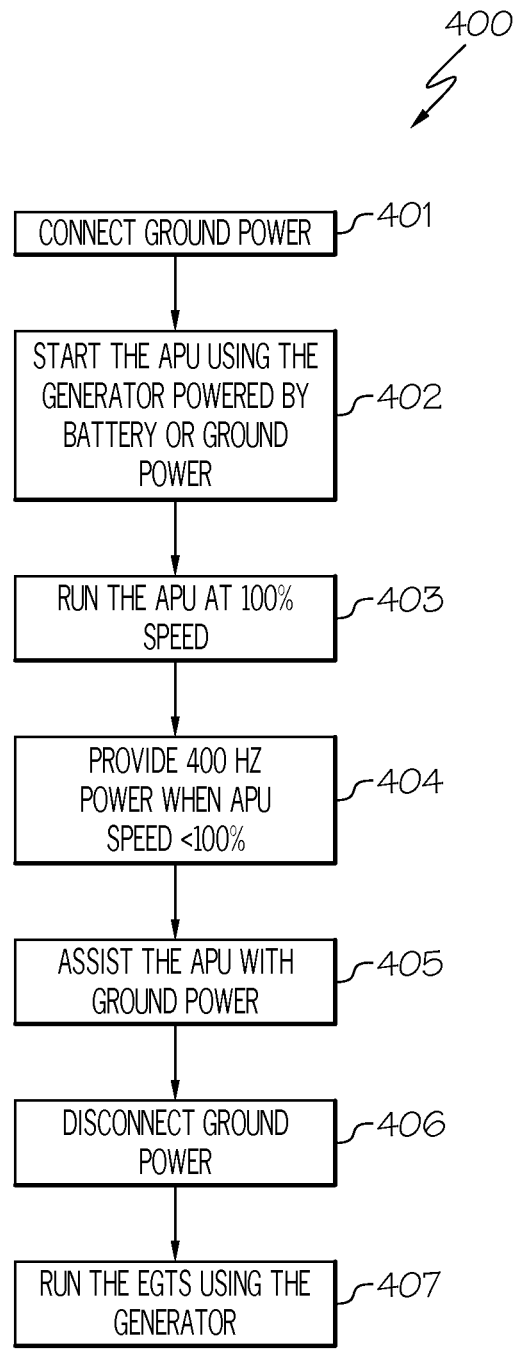
FIG. 5 is flow chart showing a method of the present invention.

Referring to now FIG. 5, an exemplary application flow chart 400 with any one of the above described power system embodiments may include the following steps: (401) ground power is connected while the aircraft is parked at a gate of an airport; (402) at least one MPCC in one of the power systems may start an APU using an APU generator and powered by either ground power from the gate or battery power from the aircraft; (403) the APU may run at 100% speed so that the APU generator provides 400 Hz power directly to the aircraft's main bus and power unit; (404) the MPCC provides 400 Hz power to the aircraft when the APU speed is reduced to less than 100%, such as about 90% to save fuel; (405) the MPCC may use ground power to assist the APU via the APU generator; (406) ground power is disconnected; (407) The MPCC drives EGTS motors to taxi the aircraft using the power supplied by the APU generator. The order of steps 401, 402, 403, 404, 405, 406, and 407 may be in any given order depending on the desired operation.

It should be understood, of course, that the foregoing relates to exemplary embodiments of the invention and that modifications may be made without departing from the spirit and scope of the invention as set forth in the following claims.

We claim:

1. A power system for an aircraft, comprising:
    an auxiliary power unit (APU) having an AC generator; and
    a multifunction power converter-controller module electrically connected to the AC generator, the multifunction power converter-controller module including at least one multifunction power converter-controller (MPCC),
    wherein the at least one MPCC is configured to control the AC generator to use ground power to run as a motor to provide mechanical power assist for the APU so that the APU provides bleed air for an environmental control system that the APU runs with a reduced fuel burn that is less than a fuel burn that would occur if the APU were to run without the mechanical power assist, and
    wherein the ground power is supplied through the at least one MPCC.

2. The system of claim 1, wherein the at least one MPCC is configured to start the APU using the AC generator powered by the ground power from a ground power network.

3. The system of claim 1, wherein the multifunction power converter-controller module is configured to receive an AC power input from the AC generator at a first frequency and supply AC power output to an aircraft power distribution system at a second frequency, wherein the first frequency is different from the second frequency.

4. The system of claim 3, wherein the first frequency is less than 400 Hz and the second frequency is 400 Hz.

5. The system of claim 1, wherein the AC generator is a controllable frequency generator.

6. The system of claim 5, wherein the multifunction power converter-controller module further includes a controllable frequency generator controller to control the controllable frequency generator to provide an AC power output at 400 Hz.

7. The system of claim 4, wherein the at least one MPCC is connected to a filter to filter the AC power output with the second frequency before supplying the filtered AC power output to the aircraft power distribution system, wherein the filter includes a 4-wire transformer.

8. The system of claim 1, wherein a source of the ground power is an airport power network.

9. The system of claim 1, wherein the at least one MPCC is configured to start the APU using the AC generator using battery power supplied from an on board battery system, wherein the battery power is supplied directly or via a DC/DC converter.

10. The system of claim 1, wherein the at least one MPCC is configured to receive AC power from the AC generator to drive traction motors of an electric taxi system.

11. A method of operating an auxiliary power unit (APU) of an aircraft, comprising:
    supplying ground power to a multifunction power converter-controller (MPCC) of the aircraft from a ground power network;
    converting the ground power with the MPCC to produce a power output;
    motoring an AC generator of the APU with the power output from the MPCC; and
    driving a bleed air system of the aircraft via the APU with mechanical power assist supplied from the AC generator of the APU so that the APU runs with a reduced fuel burn that is less than a fuel burn that would occur if the APU were to run without motoring the AC generator with the power output from the MPCC.

* * * * *